US012637114B2

(12) United States Patent
Gyllenhammar et al.

(10) Patent No.: US 12,637,114 B2
(45) Date of Patent: May 26, 2026

(54) DYNAMIC RISK ADAPTATION IN A VEHICLE

(71) Applicant: ZENSEACT AB, Gothenburg (SE)

(72) Inventors: Magnus Gyllenhammar, Pixbo (SE); Fredrik Sandblom, Mölndal (SE); Gabriel Rodrigues De Campos, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 17 days.

(21) Appl. No.: 18/753,386

(22) Filed: Jun. 25, 2024

(65) Prior Publication Data

US 2025/0002056 A1     Jan. 2, 2025

(30) Foreign Application Priority Data

Jun. 27, 2023     (EP) ..................................... 23181755

(51) Int. Cl.
B60W 60/00          (2020.01)
B60W 30/12          (2020.01)
(52) U.S. Cl.
CPC ........  B60W 60/0059 (2020.02); B60W 30/12 (2013.01); B60W 2710/18 (2013.01); B60W 2710/20 (2013.01); B60W 2720/106 (2013.01)
(58) Field of Classification Search
CPC ... B60W 2050/0028; B60W 2540/225; B60W 2554/4029; B60W 2554/4045; B60W 2554/4046; B60W 2710/18; B60W 2710/20; B60W 2720/106; B60W 30/12; B60W 30/18154; B60W 30/182; B60W 30/18159; B60W 60/0059
See application file for complete search history.

(56) References Cited

U.S. PATENT DOCUMENTS

| | | |
|---|---|---|
| 2013/0030657 A1 | 1/2013 | Chatterjee et al. |
| 2017/0241791 A1 | 8/2017 | Madigan et al. |
| 2020/0094737 A1* | 3/2020 | Furukawa ............. B60W 30/08 |
| 2021/0061269 A1 | 3/2021 | Petroff et al. |

(Continued)

FOREIGN PATENT DOCUMENTS

| | | |
|---|---|---|
| EP | 3895950 A1 | 10/2021 |
| WO | 2021/067380 A1 | 4/2021 |
| WO | 2021/074321 A1 | 4/2021 |

OTHER PUBLICATIONS

European Search Report mailed Nov. 28, 2023 for European Patent Application No. 23181755.2, 7 pages.

*Primary Examiner* — Wade Miles
*Assistant Examiner* — Zachary Joseph Wallace
(74) *Attorney, Agent, or Firm* — Sage Patent Group

(57) ABSTRACT

The present disclosure relates to methods, systems, a vehicle and a computer-readable storage medium and a computer program product. The method includes obtaining a baseline risk model generated based on one or more risk-associated parameters. The method further includes obtaining sensor data from a sensor system of a vehicle. The method further includes estimating one or more risk values associated with the one or more risk-associated parameters based on the obtained sensor data and generating, based on the one or more estimated risk values, an adopted risk model. Further, the method includes provisioning the generated adopted risk model for determining an acceptable risk model for forming a driving policy of an ADS.

14 Claims, 4 Drawing Sheets

(56) References Cited

U.S. PATENT DOCUMENTS

| 2021/0269051 A1 | 9/2021 | Mcgill, Jr. et al. | |
| 2022/0119010 A1* | 4/2022 | Beaurepaire | G08G 1/22 |
| 2022/0410882 A1 | 12/2022 | Bush et al. | |

* cited by examiner

DYNAMIC RISK ADAPTATION IN A VEHICLE

CROSS-REFERENCE TO RELATED APPLICATIONS

The present application for patent claims priority to European Patent Office Application Ser. No. 23181755.2, entitled "DYNAMIC RISK ADAPTATION IN A VEHICLE" filed on Jun. 27, 2023, assigned to the assignee hereof, and expressly incorporated herein by reference.

TECHNICAL FIELD

The disclosed technology relates to methods and systems for determining risk for a vehicle in various locations and traffic scenarios. In particular, but not exclusively the aspects and embodiments of the disclosed technology relate to determining an acceptable risk model for forming a driving policy for an Automated Driving System (ADS) of the vehicle.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS-which for instance may be represented by adaptive cruise control (ACC), collision avoidance systems, forward collision warning, etc.—are electronic systems that may aid a vehicle driver while driving. Today, there is ongoing research and development within a number of technical areas associated to driving automation, including both the ADAS and the Automated Driving (AD) field. ADAS and AD will herein be referred to under the common term Automated Driving System (ADS) comprising all of the different levels of automation as for example defined by the SAE J3016 levels (0-5) of driving automation, and in particular for level 3-5.

In a not too distant future, inclusion of AD features or ADS solutions in new cars is expected to grow rapidly. An ADS may be construed as a complex combination of various components that can be defined as systems where perception, decision making, and operation of the vehicle are performed by electronics and machinery instead of or in tandem with a human driver, and as introduction of unsupervised automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as, e.g., radar, LIDAR, sonar, camera, navigation system, e.g., GPS, odometer and/or inertial measurement units (IMUs), upon which advanced control systems may interpret sensory information to identify appropriate navigation paths, as well as obstacles, free-space areas, and/or relevant signage.

Ensuring the safety and performance of ADS is one of the key challenges in transitioning from a state of well-performing proof of concepts into a product, viable for mass production and usage on public roads. Since approaches such as statistical brute force validation of safe operation on complete vehicle level are infeasible, as, e.g., in a report indicating a need for driving 6 billion miles without fatal failures to show that safety is on par with human drivers in the US, there is a need for more refined methods in the field. Alternative approaches may include formal methods, where the ADS is proven to be safe given certain sets of assumptions about its operational environment. For example, methods have been suggested under the assumptions of rule-behaving traffic without presence of any additional uncertainties. Similarly, another approach assumes a certain behavior of the surrounding traffic and if this is indeed the case, the ADS can be proven to be safe. However, in many cases the safety risks that the ADS will face arise from situations, and unforeseen traffic scenarios that are not within the limits of traffic rules or even conventional driving scenarios, but from rather what is called corner cases or edge cases. These cases may involve undetected VRUs (vulnerable road users) or VRUs appearing suddenly either on the perception border or from an occluded state around the vehicle. Other cases of unusual event may include very aggressive driving from nearby traffic participants or adverse weather or road conditions imposing unforeseen consequences.

There is thus a pressing need in the art for new and improved solutions for determining risk models addressing complex road traffic scenarios in order to ensure safety as well as performance of ADS-equipped vehicles and accordingly for forming driving policies based on such risk models.

SUMMARY

The herein disclosed technology seeks to mitigate, alleviate or eliminate one or more of the above-identified deficiencies and disadvantages in the prior art to address various problems relating to improving safety and boosting performance of ADS systems by dynamically and adaptively determining risk models. Further, forming ADS driving policy based on the determined acceptable risk models is presented. In several aspects and embodiments in the present disclosure, a risk model may be understood as models that express the level of risk in a given situation based on the capabilities of a driver (an ADS or a human driver) to properly respond to development of possible traffic situations. These risk models can be used to develop ADSs demonstrating improved safety and performance measures.

Various aspects and embodiments of the disclosed invention are defined below and in the accompanying independent and dependent claims. The term exemplary is in the present context to be understood as serving as an instance, example or illustration.

A first aspect of the disclosed technology comprises a method. The method is presented for determining an acceptable risk model for forming a driving policy for an Automated Driving System (ADS).

The method comprises obtaining, a baseline risk model generated based on one or more risk-associated parameters. Further, the method comprises obtaining sensor data from a sensor system of a vehicle, wherein the vehicle is a human driver-operated vehicle or an ADS-operated vehicle. The sensor data comprises sensor data of a perception and/or maneuvering system of the vehicle, and sensor data associated with a driving behavior of the vehicle in a specific location and/or a specific scenario. The method further comprises estimating one or more risk values associated with the one or more risk-associated parameters based on the obtained sensor data. The method further comprises generating, based on the one or more estimated risk values, an adopted risk model by updating one or more model parameters of the baseline risk model for the specific location and/or scenario. Even further, the method comprises provisioning the generated adopted risk model for determining the acceptable risk model for forming the driving policy of the ADS.

In several embodiments and aspects, the baseline risk model may be generated based on one or more risk-associated parameters. The risk-associated parameters may comprise any one of statistical probabilities of occurrences of various types of accidents or incidents in the specific location and/or the specific scenario, statistical probabilities and/or attributes of one or more external objects appearing in a surrounding environment of the vehicle in the specific location and/or the specific scenario, or driving behavior of a plurality of human driver-operated or ADS-operated vehicles in the specific location and/or the specific scenario.

Driving behavior for the human driver-operated vehicle may comprise at least a reaction time, acceleration, braking, steering, lane keeping, or speed control of the driver and/or a direction of gaze and a trajectory of visual attention of the driver and/or selected safety margins by the driver. Driving behavior for the ADS-operated vehicle may comprise at least ADS-controlled acceleration, braking, steering, lane keeping, or speed control of the vehicle.

In several embodiments, the specific location may at least comprise a specific geographical location on a map, and/or a specific type of location. The specific location may include an intersection. The specific scenario may at least comprise an occluded state in the surrounding environment of the vehicle.

In several embodiments and aspects, the method may further comprise provisioning the generated adopted risk model for determining the acceptable risk model by transmitting the generated adopted risk model of the vehicle to a remote server for determining the acceptable risk model based on a plurality of adopted risk models transmitted by the plurality of human driver-operated or ADS-operated vehicles.

In several aspects and embodiments, the vehicle may comprise an Automated Driving System, ADS. In several aspects and embodiments, the method may be performed by a control system of the vehicle comprising processing circuitry configured for performing the various embodiments and steps of the method. In several aspects and embodiments, the method may be performed by a control system of the server or data center comprising processing circuitry configured for performing the various embodiments and steps of the method.

In several aspects and embodiments, the vehicle is an ADS-equipped vehicle, wherein the method may further comprise receiving, from the remote server, the determined acceptable risk model formed based on consolidated information obtained from the plurality of human driver-operated and ADS-operated vehicles. The method may further comprise receiving, from the remote server, an updated driving policy of the ADS formed based on the determined acceptable risk model.

In several embodiments, the consolidated information may comprise the generated adopted risk models of the plurality of human driver-operated and ADS-operated vehicles being transmitted to the remote server. The determined acceptable risk model may comprise one or more globally updated baseline risk model parameters determined based on the consolidated information fulfilling an acceptable risk criteria.

In several embodiments and aspects, the acceptable risk criteria may comprise the adopted risk by the human driver-operated vehicles indicative of a safely improved performance of the human driver-operated vehicles.

It would be very valuable to be able to tune the acceptable risk of the ADS dynamically according to places and scenarios where human drivers accept a slightly higher level of risk. The dynamic risk taken by the ADS is always designed to be safe in any such situation, but as a result of the variability, the performance of the ADS can be drastically improved within a range of driving behavior that is still be considered as safe. It was further realised that identifying where this may be a possible adaptation can be done by studying driver risk variability.

Executable instructions for performing these functions and embodiments of the method are, optionally, included in a non-transitory computer-readable storage medium or other computer program product configured for execution by one or more processors.

According to a second aspect of the present disclosure there is provided a (non-transitory) computer-readable storage medium comprising instructions which, when executed by one or more processors of a computing device of a vehicle, causes the computing device to carry out the method according to any one of the embodiments of the method disclosed herein.

According to a third aspect of the present disclosure, there is provided a computer program product comprising instructions which, when the program is executed by one or more processors of a computing device of a vehicle, causes the computing device to carry out the method according to any one of the embodiments of the method disclosed herein.

According to a further fourth aspect, there is provided a system for determining an acceptable risk model for forming a driving policy for an Automated Driving System, ADS. The system comprises processing circuitry configured to obtain, a baseline risk model generated based on one or more risk-associated parameters. The processing circuitry is further configured to obtain sensor data from a sensor system of a vehicle, wherein the vehicle is a human driver-operated vehicle or an ADS-operated vehicle. The sensor data comprises sensor data of a perception and/or maneuvering system of the vehicle, and sensor data associated with a driving behavior of the vehicle in a specific location and/or a specific scenario. The processing circuitry is further configured to estimate one or more risk values associated with the one or more risk-associated parameters based on the obtained sensor data. Further, the processing circuitry is configured to generate, based on the one or more estimated risk values, an adopted risk model by updating one or more model parameters of the baseline risk model for the specific location and/or scenario. The processing circuitry is further configured to provision the generated adopted risk model for determining the acceptable risk model for forming the driving policy of the ADS.

According to yet another fifth aspect, there is provided a vehicle comprising one or more vehicle-mounted sensors configured to monitor a surrounding environment, maneuvering and/or a driving behavior of the vehicle. The vehicle further comprises a system according to the fourth aspect and various embodiments of the fourth aspect. The vehicle may further comprise an ADS system for controlling one or more of acceleration, steering, and braking of the vehicle.

Further embodiments of the different aspects are defined in the dependent claims.

It is to be noted that all the embodiments, elements, features and advantages associated with the first aspect also analogously apply to the second, third, fourth and the fifth aspects of the present disclosure.

These and other features and advantages of the present disclosure will in the following be further clarified in the following detailed description.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings. The drawings are not to scale.

DETAILED DESCRIPTION

Figure 1:
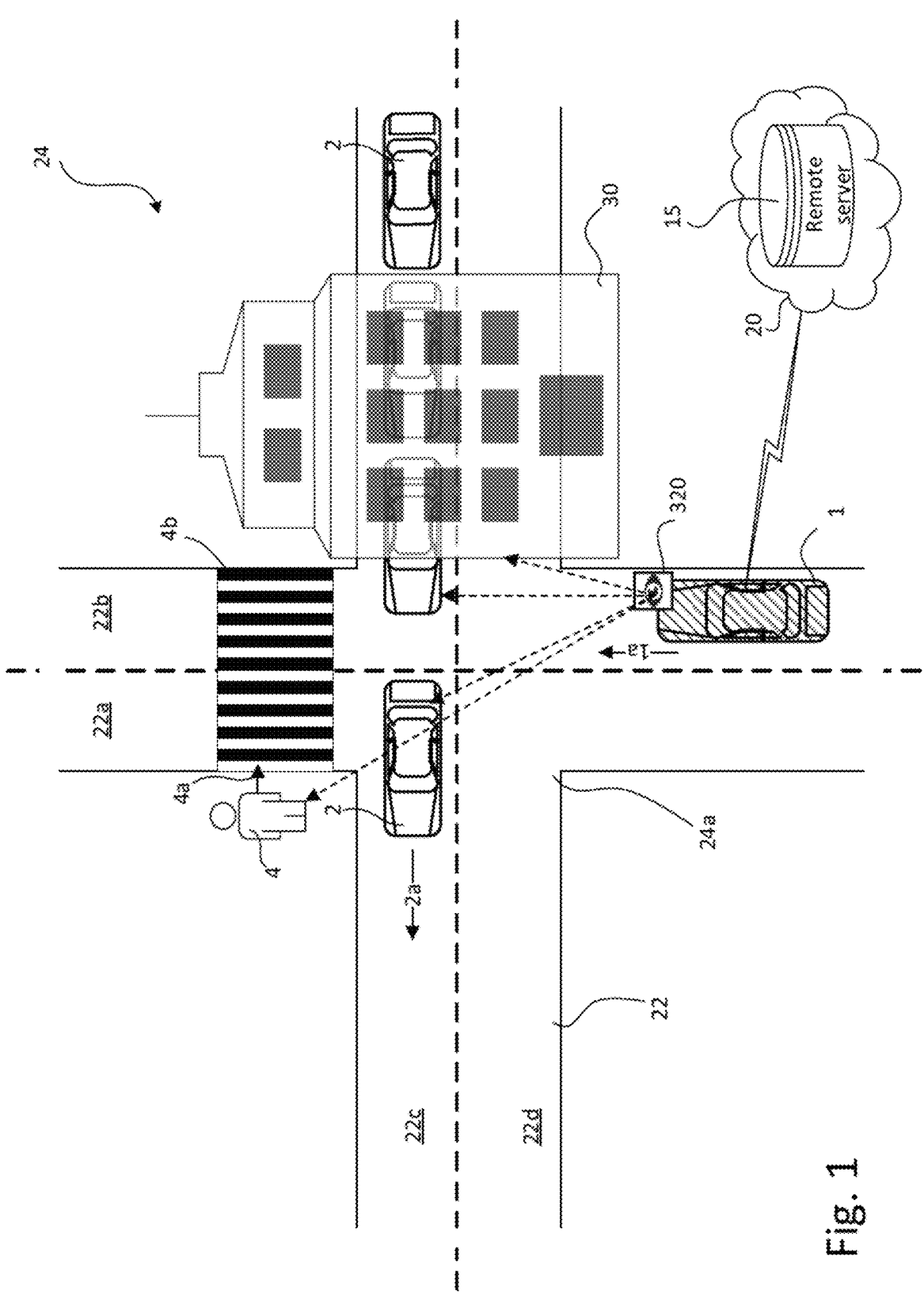
FIG. 1 illustrates a schematic top view of a road and at least one vehicle traveling on the road in accordance with several embodiments of the present disclosure.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative. The term "obtaining" is herein to be interpreted broadly and encompasses receiving, retrieving, collecting, acquiring, and so forth. As used herein, the term "if" may be construed to mean "when or "upon" or "in an instance of" or "in response to determining or "in response to detecting" depending on the context. Similarly, the phrase "if it is determined" or "when it is determined" or "in an instance of" may be construed to mean "upon determining or "in response to determining" or "upon detecting and identifying occurrence of an event" or "in response to detecting occurrence of an event" depending on the context.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

In the following description of exemplary embodiments, the same reference numerals denote the same or similar components.

Ensuring safety of an ADS may include improved or, at least, on par performance compared to human drivers. It should be noted that a huge contribution to what makes the traffic environment safe is the exceptional ability of humans to analyze challenging situations and also compensate for other drivers' mistakes or unpredictable behavior.

This may be achieved by ensuring that the ADS does not take any elevated risks at any position of its operational domain. However, humans regularly accept higher risks in certain conditions in order to operate the vehicle in a reasonable manner and get to the destination. For example, driving through a four-way intersection would be associated with the risk of a speeding vehicle or a vehicle driving dangerously approaching from the orthogonal direction, which would be difficult to safely avoid by the own vehicle's side. This is particularly important for traffic locations and scenarios involving impaired vision, blind spots or occluded areas in the surrounding environment of the vehicle. For instance, a building blocking the sight of the driver of the vehicle, as well as sensor devices mounted on the vehicle. Despite this, human drivers regularly assess the traffic situations, form decisions, take various levels of risk and enter intersections, such as intersection 24a as explained in more detail in the following, at both high and low speeds accordingly. Thus, to achieve a safe, yet effectively operational ADS, variable accepted risk levels should be considered since simply placing a constant risk limit or threshold across all operating conditions, scenarios and domains would result in a hindered and impaired ADS functionality and performance.

Understanding what these risk levels should be and how they differ for a human driver and an automation system, however, is not evident from the present art. The systems and methods described herein provide solutions for estimating the dynamic risk that humans accept in various locations and traffic scenarios.

In the present context risk may include an underlying risk associated with the possibility of an event or scenario happening in a surrounding environment of the vehicle. For instance, a pedestrian stepping out from behind a building or an occluded space, a car making an unexpected turn, a building being a school building with many children who may behave unpredictably, etc.

One objective herein is to determine and learn such risk-prone scenarios having characteristics or elements making them more susceptible to potential hazards, uncertainties, or unfavorable outcomes, in order to improve behavior of the AD systems.

Additionally, or alternatively risk may arise from misunderstanding of a given scenario, and different ways the drivers may perceive and react to the given scenario. For example, a driver may drive as if the road is clear but overlook presence of a pedestrian suddenly walking into the road and in front of the vehicle. Thus, in such scenarios there is a discrepancy between how the driver should have behaved, i.e., more vigilantly and carefully versus how the driver actually behaved due to misunderstanding of the hazardous scenario and not reacting accordingly.

Embodiments and aspects herein, provide solutions for analyzing a multitude of scenarios and events in order to identify the origins of risk human drivers or ADS operators adopt in order to improve capabilities of the AD systems.

The adopted dynamic risk by the human drivers that safely improves the performance and user-experience of the human-operated vehicles is accordingly utilized as an input to adaptively determine the quantitative safety and/or quality requirements of the ADS system and, in turn, form the driving policy of the ADS. While driving, humans usually accept risk differently depending on the context they are driving in. The risk humans accept may often be implicit and even unknown to the drivers themselves, i.e., not having a quantitative value assigned. However, an ADS equipped with a risk estimation system such as a risk map, or a type of risk model would be able to accurately estimate the risk a human takes while driving. The risks taken by humans are known to be one of the underlying factors contributing to the traffic accidents that occurs today. Ideally, the ADS are developed to quantitatively surpass the driving behavior of human drivers with respect to accidents, and safety, however as mentioned earlier assigning a single risk metric that should be upheld across all operational conditions and situations will lead to very conservatively performing ADS. This would result in ADS avoiding manoeuvres that quantitatively can be safe to execute and would make the ADS much more versatile.

It would be very valuable to be able to tune the acceptable risk of the ADS dynamically according to places and scenarios where human drivers accept a slightly higher level of risk. The dynamic risk taken by the ADS is always designed to be safe in any such situation, but as a result of the variability, the performance of the ADS can be drastically improved within a range of driving behavior that is still be considered as safe. It was further realised that identifying where this may be a possible adaptation can be done by studying driver risk variability.

FIG. 1 illustrates a schematic perspective view of an exemplary four-way intersection 24a on which a travelling vehicle 1 in a hatched-line shaded pattern is depicted. The intersection 24a may be a part of a portion 24 of a road 22. Moreover, FIG. 1 shows at least one external vehicle 2 traveling on the same portion 24 of a road 22 as the vehicle 1 but approaching the intersection 24a in a direction 2a transvers to the travel direction 1a of vehicle 1. In several examples and embodiments, the road 22 may be any type of road, e.g., part of a motorway, freeway or expressway. The road may also be a country road, rural road, a part of a parking lot or part of a garage facility, or any other suitable carriageway. The road may have a plurality of lanes such as more than one lane in the same travelling direction, e.g., two or more lanes 22a, 22b, 22c, 22d or at least one lane in each travelling direction as is usually the case for rural roads. The road 22 has two lanes 22a and 22b extending in the longitudinal direction and two lanes 22c, 22d extending in the transverse or horizontal direction in this example. The lanes 22a, 22b may comprise lane markers of different types, e.g., lane marker showing dashed lane marker type and the lane marker showing solid lane marker type. In some examples, the road may lack any specific lane markings. In this example the vehicle 1 is travelling on lane 22b and vehicle 2 approaching from the east is travelling on lane 22c. The intersection has a building 30 located at its cast corner such that the view of the vehicle 1 approaching the intersection 24a is at least partially blocked. By view or vision of the vehicle 1 in the present context it is meant either the vision of the driver of the vehicle 1, or the view of sensor devices of the vehicle such as sensor system 320 including cameras, radars, LIDARs, etc. The view of the vehicle 1 may be partly or entirely blocked by obstacles such as the building 30 in the example intersection 24a.

As mentioned above, in several embodiments and aspects, the vehicle 1 comprises a sensor system 320 configured for detecting scenarios which may occur in a surrounding environment of the vehicle 1. The sensor system 320 is thus configured for collection of information about the surrounding environment of the vehicle 1. The surrounding environment of the vehicle can be understood as a general area around the vehicle 1 in which scenarios comprising objects (such as other vehicles, landmarks, obstacles, etc.) or scenes can be detected and identified by vehicle sensors (radar, LIDAR, cameras, etc.), i.e., within a sensor range of the vehicle. The sensor system 320 may further comprise localization systems, speed and acceleration measurement sensor devices, eye tracking sensor devices, acceleration and/or braking pedal sensor devices, etc. for measuring various parameters associated with the vehicle. The sensor system 320 may thus comprise sensor devices for recording and generating sensor data of a perception and/or maneuvering system of the vehicle 1.

The vehicle 1 comprises a control system 10, which may otherwise be referred to as the control apparatus 10. The control system 10 of the vehicle 1 comprises control circuitry 11, otherwise referred to as processing circuitry 11, configured to obtain data comprising information about the surrounding environment of the vehicle 1, sensor data associated with the perception and/or maneuvering system and so forth. The information and sensor data of the surrounding environment of the vehicle 1 and perception and/or maneuvering system of the vehicle may be obtained from the sensor system 320 of the vehicle.

In some embodiments, the vehicle 1 may comprise a driving automation system. In the present disclosure for simply assisting the reader, the ADS has been mentioned comprising both ADAS and AD systems. In some embodiments, the ADS of the vehicle may comprise one or more ADS features that are preferably a level 2 feature or higher according to SAE J3016 levels of driving automation for on-road vehicles. In the present context, an ADS feature may be in the form of an autopilot feature, a traffic jam pilot, a highway pilot, or any other SAE J3016 level such as level 1 and higher ADS feature. In some embodiments, the control system 10 of the vehicle 1 may be a separate entity or may be a part of another control system such as the overall ADS architecture of the vehicle, and may accordingly be a module or component of the ADS.

In several aspects and embodiments, the vehicle 1 may comprise systems and modules (not specifically shown) such as collision warning module, steering module, brake control module, traction control module, etc. as part of the control system 10 of the vehicle. In several aspects and embodiments, these modules may be configured to obtain sensor data associated with operation of the vehicle itself, as well as the information about the surrounding environment of the vehicle 1. In several embodiments, these modules may be configured for monitoring and recording event and traffic situations which may occur on the road. For instance, driver behavior including steering, braking, decisions on safety margins, frequency or severity of identified or predicted potential collision events, emergency braking and other risk-associated scenarios may be recorded and logged. In ADS-equipped vehicles, the driving behavior of the ADS and corresponding events of braking, steering, predicted or identified collision events, etc. may be recorded for such ADS-controlled functions.

The obtained sensor data from the sensor system 320 may also comprise information about at least one static or moving object in the surrounding environment of the vehicle. As depicted in FIG. 1, in addition to the external vehicle 2 there is at least one object 4 present in the surrounding environment of the vehicle 1. The at least one object 4 may be a VRU, e.g., animals, wildlife (not shown), the pedestrians 4 present on lane 22*a* and trying to cross the road 22 in the direction of the arrow 4*a*. The at least one external object 4 and/or the external vehicles 2 may be present on the road 22 at certain occasions, and may appear in the surrounding environment of the vehicle in the specific locations and/or the specific scenarios.

Further, the obtained sensor data may comprise information about lane markers of the one or more lanes of the road 22, e.g., lane marker type (e.g., solid, dashed, double marker, etc.), traffic sign or signal information, road barrier information, such as presence or characteristics of speed bumps, or any other road obstruction objects, etc. In several embodiments, the control system 10 may have access to map data for identification of specific locations on the road. The map data may comprise high-definition (HD) map data. Therefore, any specific location in the present context may at least comprise a specific geographical location on a map, and/or a specific type of location, e.g., including an intersection, or bridge, or a location associated with a landmark, road obstacle, etc. A specific scenario in the present context may at least comprise an occluded state in the surrounding environment of the vehicle such as the building 30 in the example of FIG. 1. Additionally or, alternatively any other traffic scenarios such as cruising, overtaking, parking, reversing, etc. are conceivable.

In several embodiments and examples, the sensor data may at least partly be obtained in real time from the sensor system 320. In some exemplary embodiments, the sensor data may at least partly be obtained from a memory unit 12 of the vehicle 1. Accordingly, captured images by camera sensors and/or LIDAR and/or radar data may be stored locally in the memory 12 of the vehicle 1 and/or be transmitted to an external network 20 such as a cloud network 20, or to a remote server 15 with which the vehicle 1 may be in communication.

Various aspects and embodiments of the presented technology, and the corresponding systems and methods may be implemented and executed by means of processing circuitry 11 comprising one or more processors. The processing circuitry 11 may at least partly be comprised in the control system 10 or apparatus implemented in the vehicle 1. In some embodiments, the control system and processing circuitry may be a decentralized system and be implemented in the remote server 15 in communication with the vehicle 1.

The control system 10 of the vehicle 1 may accordingly be configured to register and determine scenarios occurring in the surrounding environment of the vehicles 1. The scenarios in some embodiments may correspond to a scene or an event such an incident that may occur in the surrounding environment of the vehicle 1. In some embodiments, a scenario may be determining a presence of at least one object 4 or external vehicles 2 in the surrounding environment of the vehicle 1 based on the obtained sensor data. The scenarios may also be associated with certain geographical locations such as the intersection 24*a*, specific environmental parameters such as weather conditions, time parameters, e.g., time of day, traffic rush hours, school-zone speed restrictions in certain times, etc. The scenario could also be influenced by various lighting conditions, including daylight, darkness, or nocturnal illumination on the road or at a specific location, e.g., the intersection 24*a*. The specific scenarios and/or specific locations may be associated with their respective risk parameters.

For instance in FIG. 1, two probable scenarios corresponding to potential risk events have been depicted by way of example.

In the first scenario, the external vehicle 2 traveling on lane 22*c* is approaching the intersection 24*a* in the direction 2*a* transverse to the travel direction 1*a* of vehicle 1. The view of the vehicle 1 approaching the intersection 24*a* is at least partially blocked by the building 30. The scenario involves a probability of vehicle 2 actually approaching the intersection 24*a*. The vehicle 1 thus may be prone to a potential collision event with vehicle 2, the likelihood of the collision having one or more risk parameters being associated with the driving behavior of the vehicle 1. How the human driver of the vehicle 1 or the ADS controller, in case of vehicle 1 being ADS-operated, estimate the probability of the vehicle 2 entering the intersection 24*a* and perceive the risk of collision with vehicle 2 and accordingly behave, will determine how safely and effectively the vehicle 1 drives through the intersection 24*a*. As mentioned, the risk may be partly influenced by the probability of the vehicle 2 appearing from the occluded space behind the building 30 and the model of that vehicle's 1 speed, acceleration, etc. while approaching the intersection 24*a*.

In the second scenario, a VRU, i.e., the pedestrian 4 may appear in front of the vehicle 1 crossing the road on lane 22*a* posing a safety concern to vehicle 1. Furthermore, depending on how the vehicle 1 has behaved in respect to the first scenario, i.e., speed, acceleration, braking, slowing down, speeding up, etc. upon observing vehicle 2 approaching from the east, a new traffic scenario having its own associated risk parameters may arise with respect to the pedestrian 4.

In several aspects and embodiments, the sensor data comprising sensor data of the perception and/or maneuvering system of the vehicle 1, and sensor data associated with the driving behavior of the vehicle in the specific location 24*a* and/or the specific first and/or second scenario will be recorded and processed by the control system 10. Accordingly, an adopted risk may, e.g., be quantified for the vehicle 1 based on the trajectory of the pedestrian 4, and/or range data, and/or relative velocity data of the vehicles 1 and 2, etc. perceived by the driver and/or obtained from the sensor system 320.

Human drivers and ADS controller may adopt and accept different risk levels in either of these scenarios. For instance, a human driver may be aware of a potential road-blockage or temporary road maintenance operation on road 22 and lanes 22c and 22d. In another example, the driver may be aware that the intersection 24a is located in a remote area or that the building 30 is an abandoned structure without any inhabitants and thus other vehicles or VRUs are seldom present in the area.

Therefore, the human driver may estimate a very low or close to zero probability of another vehicle, e.g., vehicle 2 approaching from the east, even though the building 30 is blocking the driver's view. Thus, the driver of vehicle 1 may drive over the intersection at a higher speed compared to the ADS controller slowing down conservatively regardless of the fact that no other vehicle 2 or VRU may enter the intersection 24a. In the absence of the pedestrian 4, the higher speed of the driver-operated vehicle 1 across the intersection 24a may be regarded as a safely-operated effective behavior with perceived low-risk by the driver. Similarly, the driving behavior of the ADS controller may be recorded as a less-effective behavior having an adopted high-risk characteristic.

However, in the event of the pedestrian 4 suddenly appearing at the side of the intersection intending to cross the road, the same behavior of the driver-operated vehicle 1 may be regarded as a high-risk and unsafe event which may lead to a collision event with the pedestrian 4. On the other hand, the driving behavior of the ADS controller may be regarded as a high-risk but safe and effective driving behavior.

Similarly, simply observing the crossing 4b by the ADS controller may lead to an unnecessary speed reduction by the vehicle 1 perceiving a high-risk scenario and a high probability of the pedestrian 4 appearing on the road at all times. However, a human driver may be aware that the area is a school zone and at certain times, for instance in the evenings, there are not many pedestrians present in the area, so approaching the intersection 24a at higher speeds may be a low-risk but highly effective behavior.

In several embodiments and aspects, the nature of the risk may be different for the humans and the ADS controller. For instance, approaching the intersection 24a at night and in darkness conditions may be conceived as a high-risk scenario for a human driver with impaired night vision, whereas the same scenario may be perceived as a low-risk scenario for the ADS controller using camera, radar and LIDAR sensors for detecting objects on the road. Thus, the ADS controller may drive over the intersection 24a at a higher speed compared to the human driver while still being in bounds of safe traffic behavior.

It should be clear to the skilled person that the depicted and described risk scenarios are simplified examples for merely elucidating the inventive systems and methods herein, and may not fully represent the accurate real-world circumstances associated with these scenarios. The skilled person also understands that many other arising scenarios may be comprised in different embodiments and aspects and equally considered for the purposes of the present disclosure.

In all the above exemplary scenarios, the control system 10 will accordingly obtain sensor data associated with the operation and driving behavior of the vehicle 1, either being human driver-operated or ADS-operated, for quantifying the adopted and accepted risk by the driver or the ADS controller.

Repeatedly estimating the risks that humans accept in such situations across a population of individuals would provide a distribution of risk acceptance. This distribution may also provide valuable insights into principle causes of traffic accidents which, will be utilized for improvements when developing ADS and their driving policy. Thus, by dynamically tuning the risk acceptable by an ADS, in the same context, scenarios and/or locations such that it is less than the estimated distribution, safer and more effective driving policies for the ADS can be formed.

In more detail, aspects and embodiments of the present disclosure provide solutions for determining an acceptable risk model for forming a driving policy for the ADS. The dynamically and adaptively tuned acceptable risk model and the ADS driving policy may then be utilized for improving the safety and performance of ADS-equipped vehicles.

To this end, the control system 10 of exemplary vehicle 1 may be configured for obtaining a baseline risk model which is typically generated based on one or more risk-associated parameters.

In several embodiments, the baseline risk model may be generated based on one or more risk-associated parameters. The one or more risk-associated parameters may comprise statistical probabilities of occurrences of various types of accidents or incidents in the specific location and/or the specific scenario, e.g., as discussed with respect to the intersection 24a of FIG. 1. Additionally or alternatively, the one or more risk-associated parameters may include statistical probabilities and/or attributes of one or more external objects, e.g., the vehicle 2 or the VRU 4 appearing in the surrounding environment of the vehicle in the specific location and/or the specific scenario. Even further, the one or more risk-associated parameters may include driving behavior of a plurality of human driver-operated or ADS-operated vehicles in the specific location and/or the specific scenario. In other words, data associated with traffic scenarios and locations may be collected from a fleet of human driver-operated or ADS-operated vehicles and used for building the baseline risk model. The vehicle 1 may obtain the baseline risk model from the remote server 15, or the baseline risk model may be uploaded onto the memory 12 of the control system 10 of vehicle 1 manually at a maintenance or test station.

In several embodiments, the control system 10 may be configured for obtaining sensor data from the sensor system 320 of the vehicle 1, wherein the vehicle may be a human driver-operated vehicle or an ADS-operated vehicle as previously mentioned. It should be appreciated that a human driver-operated vehicle may be ADS-capable (Does not have ADS installed but have the configuration required for installing an ADS) or ADS-equipped, but at the time of recording the traffic scenarios and risk estimation functions described herein be operated by a human driver. The human-operated vehicle 1 however includes the sensor system 320 and the control system 10 as well as all the other components and modules required for recording and quantifying the adopted risk by the driver in the traffic situations and geographical locations. As previously mentioned, the sensor data may comprise sensor data of the perception and/or maneuvering system of the vehicle, and sensor data associated with the driving behavior of the vehicle in the specific location and/or the specific scenario.

The control system 10 may be configured for estimating one or more risk values that are associated with the one or more risk-associated parameters based on the obtained sensor data and further for generating, an adopted risk model by updating one or more model parameters of the baseline risk model for the specific location and/or scenario. The adopted risk model for vehicle 1 may be updated based on the one or more estimated risk values. In several embodiments, the driving behavior for the human driver-operated vehicle may comprise at least a reaction time, acceleration, braking, steering, lane keeping, or speed control of the driver. Additionally or alternatively, a direction of gaze and a trajectory of visual attention of the driver may be monitored by eye-tracking sensor devices and recorded as the driver behavior. Even further, selected safety margins by the driver, braking patterns, acceleration patterns, actuating and/or releasing the brake and/or acceleration pedal by the driver may all be recorded as the driving behavior of the human driver.

Similarly, in several embodiments, driving behavior for the ADS-operated vehicles may comprise at least ADS-controlled acceleration, braking, steering, lane keeping, or speed control of the vehicle. Evidently, other functions of the vehicle controlled by the ADS may also be recorded and utilized.

Figure 2:
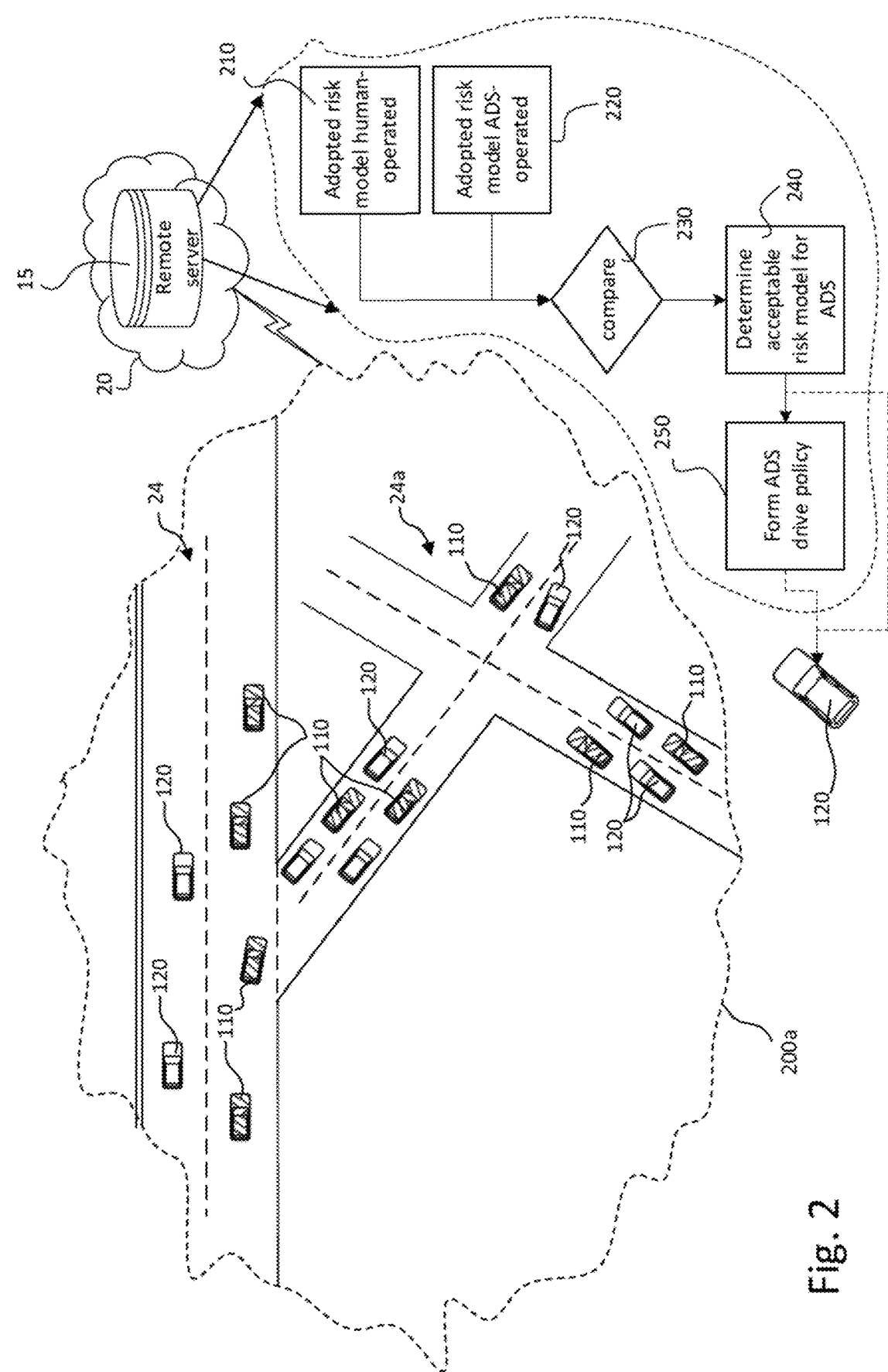
FIG. 2 shows a schematic top view illustration of a plurality of vehicles travelling on the road as well as a system in accordance with several embodiments of the present disclosure.

In several embodiments herein, the generated adopted risk model may be provisioned by the control system 10 for determining the acceptable risk model and for forming the driving policy of the ADS. By provisioning the generated risk model in the present context it is meant that the control system 10 may be configured to provide the generated adopted risk model of the vehicle 1 to the external server 15 in real time, i.e., online. Additionally or alternatively, the control system 10 may be configured to provide the generated adopted risk model in an offline mode, i.e., the values and parameters of the risk model may be stored in the memory 12 of the control system 1. The stored risk model may be provided to the remote server 15 at a later time, e.g., in predetermined time intervals, or in predetermined time schedules such as once per day, per week, etc. The control system may further be configured for providing the generated adopted risk model to the server 15 on demand, i.e., upon receiving a request from the remote server 15. Accordingly, in several embodiments and aspects, provisioning the generated adopted risk model for determining the acceptable risk model may comprise transmitting the generated adopted risk model of the vehicle to the remote server 15 for determining the acceptable risk model based on a plurality of adopted risk models transmitted by the plurality of human driver-operated or ADS-operated vehicles. In other words, the acceptable risk model may be generated based on plurality of data points received from the fleet of vehicles as shown in the example of FIG. 2. Accordingly, the one or more fleet vehicles may be connected to external network(s) 20 via for instance a wireless link for transmitting the risk model data and/or receiving queries from the remote server 15.

Amongst the plurality of vehicles of the fleet present on the road, e.g., driving in a specific geographical location such as geographical sub-region 200a including the intersection 24a at least one subset of vehicles 110 may be human-operated and one other sub-set of vehicles 120 may be ADS-operated. The vehicles included in either sub-set 110, 120 are assumed to be equipped with the sensor systems and control systems for performing at least some of the embodiments of the present disclosure.

For instance, vehicle sub-set 110 shown as hatched shaded vehicles may be human-operated and the other subset 120 may be ADS-operated. It should be clear that any other number of vehicles than the illustrated vehicles 110 being hatched shaded, may be comprised in the fleet vehicles, and the illustration of the example vehicles and the traffic scenario in FIG. 2 is merely for the sake of assisting the reader. Furthermore, vehicle sub-sets 110, 120 may be present in the geographical location such as the intersection 24a at the same time or cross the intersection 24a at different time points having associated time stamps. For instance, driving behavior of human-operated vehicles 110 or the ADS-operated vehicles 120 at the same intersection 24a may be recorded for both the daytime and evening hours, e.g., to investigate differing behavioral patterns of drivers during school hours in case of the intersection being included in a school zone and so forth.

By utilizing vehicle data of the fleet of vehicles, systems and methods can be provided for forming statistically-relevant risk estimation by humans and ADS controllers in various locations and scenarios. Analyzing the collected data may accordingly reveal patterns of behavior associated with various risk levels adopted by humans and ADS controllers alike. Therefore, deep insight is provided for updating the acceptable risk model for the ADS controller based on one or more risk parameters adopted by humans which will lead to safely improve the performance and update the driving policy of the ADS.

By frequently querying the adopted risk models of the vehicle fleet, the acceptable risk model for the ADS can be continuously updated and improved thanks to the large amounts of data continuously generated by the fleet vehicles. In several embodiments and aspects, the acceptable risk model may be determined at the server 15 manually, e.g., by human operators reviewing or analyzing the obtained generated adopted risk models from the fleet. In some exemplary embodiments, the server and processing circuitry of the server 15 may be adapted for at least partly determining the acceptable risk model parameters automatically or based on input received from human operators. Human operators may manually identify acceptable risk levels amongst the adopted risk by the human drivers associated with risky scenarios and decide on the safety and performance factors and parameters based on identifying characteristics of the scenario or the associated location. This way it is ensured that the seemingly elevated risk parameters taken by human drivers leading to improved performance and user experience would be closely scrutinized for safety requirements. The acceptable risk model parameters for the ADS would thus be updated only with the parameters of the adopted risk models by the drivers which pass the safety requirements. The safety requirements may be an acceptable risk criteria defined for identification and disposal of risk parameters associated with erratic, dangerous, irresponsible or aggressive driving behavior and risk taking patterns by the human drivers.

In several embodiments and aspects, the determined acceptable risk model may be formed based on consolidated information obtained from the plurality of human driver-operated and ADS-operated vehicles. The consolidated information may comprise statistical models of risk and performance levels formed based on the obtained adopted risk models from the fleet.

In several embodiments, the consolidated information may comprise the generated adopted risk models 210, 220 of the plurality of human driver-operated and ADS-operated vehicles being transmitted to the remote server 15 as shown in the block diagram of FIG. 2. The determined acceptable risk model may comprise one or more globally updated baseline risk model parameters determined based on the consolidated information fulfilling the acceptable risk criteria. As mentioned above, the acceptable risk criteria may comprise the adopted risk by the human driver-operated vehicles indicative of a safely improved performance of the human driver-operated vehicles in the specific traffic scenarios and/or locations. Stated differently, the acceptable risk criteria may comprise the adopted risk by the human driver-operated vehicles indicative of an improved performance of the human driver-operated vehicle while still deemed and determined as safe.

The consolidated information of the sub-set 110 may be compared 230 with the consolidated information obtained from the sub-set 120 of the fleet for a specific scenario and/or location. This way discrepancies in the adopted risk levels and ensuing performance by the human-operated sub-set 110 and the ADS-operated sub-set can be advantageously identified. After analysis and determination in the server 15, ADS acceptable risk model parameters can be updated 240 to encompass new knowledge that resembles what human drivers safely use and operate the vehicle more effectively, e.g., in the example of the abandoned building 30 discussed with reference to FIG. 1. This way the overly cautious risk parameters adopted by the ADS may be updated with the knowledge that the probability for another vehicle 2 approaching from the east side of the intersection is extremely low, and thus the ADS-operated vehicle can continue driving by maintaining speed without unnecessarily slowing down. Another possible outcome is that the ADS-operated vehicle slows down but not as much as earlier, depending on how large the updated risk is perceived to be.

In several embodiments, driving policy of the ADS may be formed and updated 250 in the remote server based on the determined acceptable risk model.

In several embodiments as shown in the example of FIG. 2, vehicles 120 being equipped with the ADS may receive, from the remote server, the determined acceptable risk model formed based on consolidated information obtained from the fleet, i.e., plurality of human driver-operated and ADS-operated vehicles. Further the ADS-equipped vehicles 120 may receive, from the remote server, an updated driving policy of the ADS formed based on the determined acceptable risk model.

Figure 3:
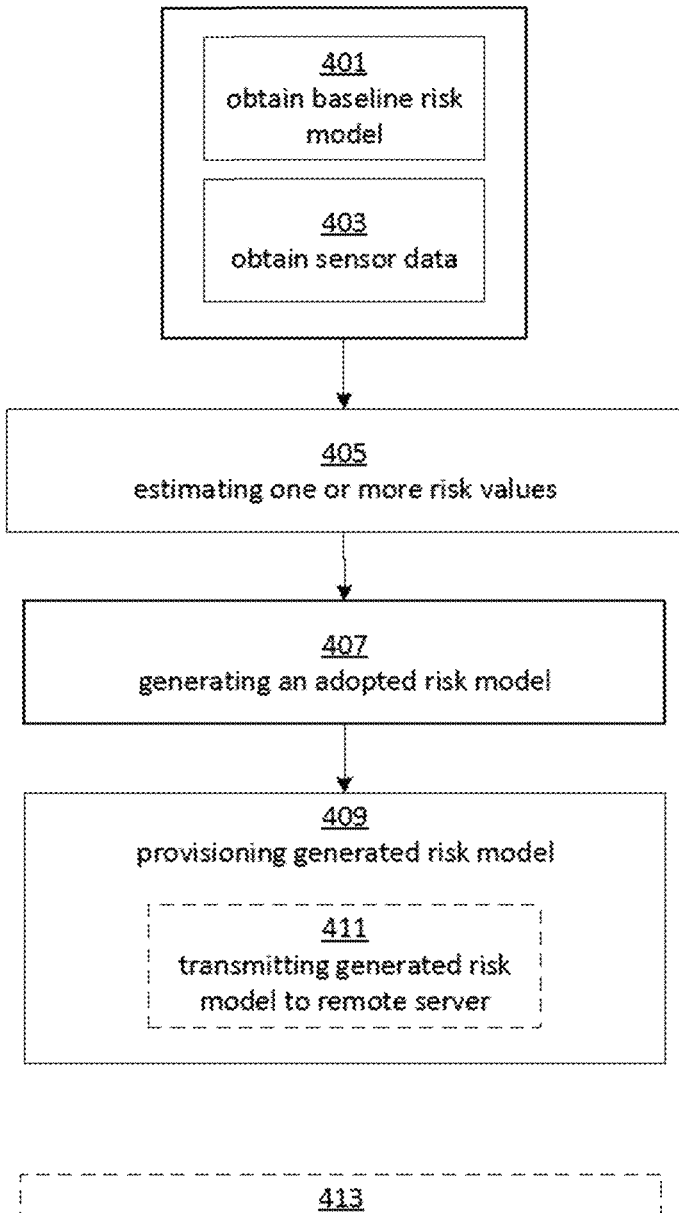
FIG. 3 shows a schematic flowchart illustrating a method in accordance with several embodiments of the present disclosure.

FIG. 3 shows a flowchart of a method 400 according to various aspects and embodiments of the present disclosure and with reference to the technology presented in FIG. 1 and FIG. 2.

The method 400 is presented for determining an acceptable risk model for forming a driving policy for an Automated Driving System, ADS. The method 400 comprises obtaining 401 a baseline risk model generated based on one or more risk-associated parameters. The method 400 further comprises obtaining 403 sensor data from a sensor system 320 of a vehicle 1, wherein the vehicle is a human driver-operated vehicle or an ADS-operated vehicle. The sensor data comprises sensor data of a perception and/or maneuvering system of the vehicle, and sensor data associated with a driving behavior of the vehicle in a specific location and/or a specific scenario. The method 400 further comprises estimating 405 one or more risk values associated with the one or more risk-associated parameters based on the obtained sensor data and generating 407, based on the one or more estimated risk values, an adopted risk model by updating one or more model parameters of the baseline risk model for the specific location and/or scenario. Further, the method 400 comprises provisioning 409 the generated adopted risk model for determining the acceptable risk model for forming the driving policy of the ADS.

In several aspects and embodiments, the baseline risk model may be generated based on one or more risk-associated parameters comprising any one of statistical probabilities of occurrences of various types of accidents or incidents in the specific location and/or the specific scenario; statistical probabilities and/or attributes of one or more external objects appearing in a surrounding environment of the vehicle in the specific location and/or the specific scenario; or driving behavior of a plurality of human driver-operated or ADS-operated vehicles in the specific location and/or the specific scenario.

In several embodiments, the driving behavior for the human driver-operated vehicle may comprise at least a reaction time, acceleration, braking, steering, lane keeping, or speed control of the driver and/or a direction of gaze and a trajectory of visual attention of the driver and/or selected safety margins by the driver. The driving behavior for the ADS-operated vehicle may comprise at least ADS-controlled acceleration, braking, steering, lane keeping, or speed control of the vehicle 1.

In several embodiments, the specific location may at least comprise a specific geographical location on a map, and/or a specific type of location including an intersection. The specific scenario may at least comprise an occluded state in the surrounding environment of the vehicle.

In several embodiments, the method 400 may further comprises provisioning 409 the generated adopted risk model for determining the acceptable risk model by transmitting 411 the generated adopted risk model of the vehicle to a remote server 15. The acceptable risk model may be determined based on a plurality of adopted risk models transmitted by the plurality of human driver-operated 110 or ADS-operated vehicles 120 as explained with reference to FIG. 2.

In several embodiments herein, wherein the vehicle may be an ADS-equipped vehicle 1, 120. The method 400 may further comprise receiving 413, from the remote server 15, the determined acceptable risk model formed based on consolidated information obtained from the plurality of human driver-operated and ADS-operated vehicles 110, 120. The method 400 may further comprise receiving 415, from the remote server, an updated driving policy of the ADS formed based on the determined acceptable risk model.

In several embodiments, the consolidated information may comprise the generated adopted risk models of the plurality of human driver-operated and ADS-operated vehicles being transmitted to the remote server. The determined acceptable risk model may comprise one or more globally updated baseline risk model parameters determined based on the consolidated information fulfilling an acceptable risk criteria. In several embodiments, the acceptable risk criteria may comprise the adopted risk by the human driver-operated vehicles indicative of a safely improved performance of the human driver-operated vehicles. Stated differently, the risk parameters used to update the acceptable risk model may be the risk parameters associated with the adopted risk by the human drivers that safely improved the performance of the vehicle. For instance, the acceptable risk criteria does not include the erratic or dangerous risk levels and parameters thereof taken by the human drivers such as the scenario of the pedestrian 4 appearing on the roadside while the human-operated vehicle 1 entering the intersection 24a at a high speed as explained with reference to FIG. 1.

It should be noted that all the embodiments, elements, features, examples and advantages described earlier with reference to the control system 10 of the vehicle 1 or the fleet of vehicles 110, 120, or the processing circuitry 11 of the control system 10, and the remote sever 15 analogously and equally apply to various embodiments of the methods 400.

Executable instructions for performing these functions and embodiments of the method 400 are, optionally, included in a non-transitory computer-readable storage medium or other computer program products configured for execution by one or more processors.

Figure 4:
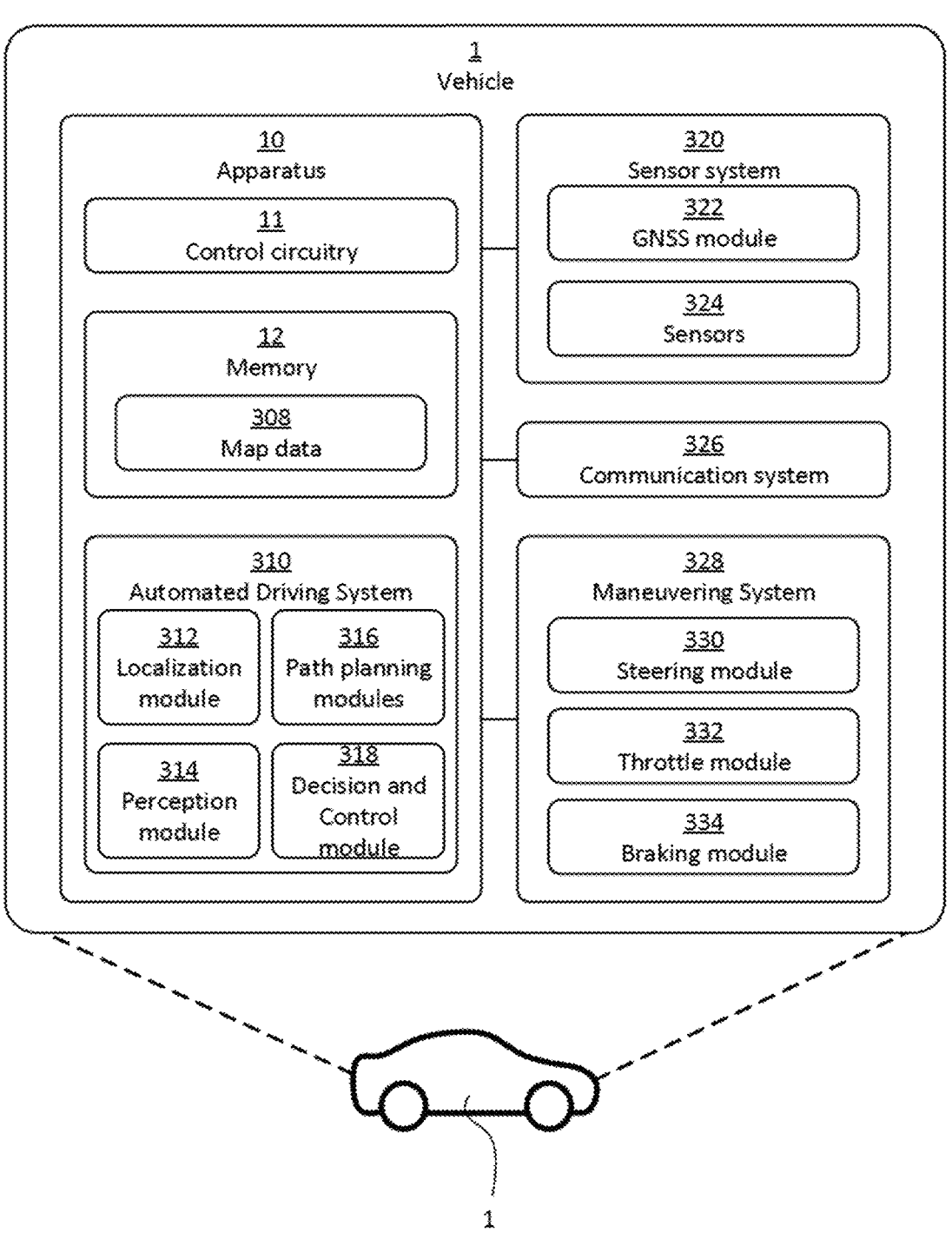
FIG. 4 shows a schematic side view illustration of the vehicle comprising a control system in accordance with some embodiments of the present disclosure.

FIG. 4 is a schematic illustration of a vehicle 1 comprising a control system 10, which may also be referred to as the control apparatus or device 10 or simply the apparatus 10. As used herein, a "vehicle" is any form of motorized transport. For example, the vehicle 1 may be any road vehicle such as a car (as illustrated herein), a motorcycle, a (cargo) truck, a bus, etc. The vehicle 1 may be an electrical vehicle (EV) or a hybrid vehicle.

The apparatus 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g., the ADS 310). Moreover, the control system 10 may form a part of the ADS 310, i.e., the control system 10 may be implemented as a module or feature of the ADS. The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

The ADS may have access to map data, for instance be used by the ADS 310 of the vehicle 1 in order to perform autonomous functions of the vehicle 1 when implemented. The map data may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed, e.g., such that one or more processors of the control circuitry 11 is provided as integral elements of the ADS 310 or any other system of the vehicle 1. In other words, according to an exemplary embodiment, any distributed or local control circuitry device may be utilized in the realization of the present inventive concept. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 4. Moreover, the vehicle 1 may comprise further elements than those shown in FIG. 4. While the various elements is herein shown as located inside the vehicle 1, one or more of the elements can be located externally to the vehicle 1. For example, the map data may be stored in a remote server 15 and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 4 should be seen merely as an illustrative example, as the elements of the vehicle 1 can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via a dedicated sensor control circuitry in the vehicle 1.

The vehicle 1 further comprises a communication system 326. The communication system 326 is configured to communicate with external units, such as other vehicles (i.e., via vehicle-to-vehicle (V2V) communication protocols), remote servers (e.g., cloud servers), databases or other external devices, i.e., vehicle-to-infrastructure (V2I) or vehicle-to-everything (V2X) communication protocols. The communication system 326 may communicate using one or more communication technologies. The communication system 326 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g., IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g., remote operator or control center of remote server 15) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 1 further comprises a maneuvering system 328. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e., from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g., comprised in one or more electronic control modules and/or nodes of the vehicle 1, adapted and/or configured to interpret sensory data-relevant for driving of the vehicle 1—to identify e.g., obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data, e.g., from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320. The ADS 310 may also comprise other modules such as a path planning module 316. In some embodiments, the localization module 312 and/or the perception module 314 may be comprised in the sensor system 320 or vice versa.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

As previously mentioned, it should be appreciated that parts of the described solution may be implemented either in the vehicle 1, in a system located external the vehicle 1, or in a combination of internal and external the vehicle; for instance, in a server 15 in communication with the vehicle, a so called cloud solution. The different features and steps of the embodiments may be combined in other combinations than those described.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method of determining an acceptable risk model for forming a driving policy for an Automated Driving System, ADS, the method comprising:

obtaining, a baseline risk model generated based on one or more risk-associated parameters;

obtaining sensor data from a sensor system of a vehicle, wherein the vehicle is a human driver-operated vehicle or an ADS-operated vehicle, wherein the sensor data comprises:

sensor data of a perception and/or maneuvering system of the vehicle, and sensor data associated with a driving behavior of the vehicle in a specific location and/or a specific scenario;

estimating one or more risk values associated with the one or more risk-associated parameters based on the obtained sensor data;

generating, based on the one or more estimated risk values, an adopted risk model by updating one or more model parameters of the baseline risk model for the specific location and/or scenario; and provisioning the generated adopted risk model for determining the acceptable risk model for forming the driving policy of the ADS.

2. The method according to claim 1, wherein the baseline risk model is generated based on one or more risk-associated parameters comprising any one of:

statistical probabilities of occurrences of various types of accidents or incidents in the specific location and/or the specific scenario;

statistical probabilities and/or attributes of one or more external objects appearing in a surrounding environment of the vehicle in the specific location and/or the specific scenario; and driving behavior of a plurality of human driver-operated or ADS-operated vehicles in the specific location and/or the specific scenario.

3. The method according to claim 1, wherein the driving behavior for the human driver-operated vehicle comprises at least a reaction time, acceleration, braking, steering, lane keeping, or speed control of the driver and/or a direction of gaze and a trajectory of visual attention of the driver and/or selected safety margins by the driver; and wherein the driving behavior for the ADS-operated vehicle comprises at least ADS-controlled acceleration, braking, steering, lane keeping, or speed control of the vehicle.

4. The method according to claim 1, wherein the specific location at least comprises a specific geographical location on a map, and/or a specific type of location including an intersection, and wherein the specific scenario at least comprises an occluded state in the surrounding environment of the vehicle.

5. The method according to claim 1, wherein the method further comprises:

provisioning the generated adopted risk model for determining the acceptable risk model by transmitting the generated adopted risk model of the vehicle to a remote server for determining the acceptable risk model based on a plurality of adopted risk models transmitted by the plurality of human driver-operated or ADS-operated vehicles.

6. The method according to claim 5, wherein the vehicle is an ADS-equipped vehicle, and wherein the method further comprises:

receiving, from the remote server, the determined acceptable risk model formed based on consolidated information obtained from the plurality of human driver-operated and ADS-operated vehicles; and receiving, from the remote server, an updated driving policy of the ADS formed based on the determined acceptable risk model.

7. The method according to claim 6, wherein the consolidated information comprises the generated adopted risk models of the plurality of human driver-operated and ADS-operated vehicles being transmitted to the remote server; and wherein the determined acceptable risk model comprises one or more globally updated baseline risk model parameters determined based on the consolidated information fulfilling an acceptable risk criteria.

8. The method according to claim 7, wherein the acceptable risk criteria comprises the adopted risk by the human driver-operated vehicles indicative of a safely improved performance of the human driver-operated vehicles.

9. A non-transitory computer-readable storage medium storing instructions which, when executed by one or more processors of a computing device of a vehicle, causes the computing device to carry out the method according to claim 1.

10. A system for determining an acceptable risk model for forming a driving policy for an Automated Driving System, ADS, wherein the system comprises processing circuitry configured for:

obtaining, a baseline risk model generated based on one or more risk-associated parameters;

obtaining sensor data from a sensor system of a vehicle, wherein the vehicle is a human driver-operated vehicle or an ADS-operated vehicle, wherein the sensor data comprises:

sensor data of a perception and/or maneuvering system of the vehicle, and sensor data associated with a driving behavior of the vehicle in a specific location and/or a specific scenario;

estimating one or more risk values associated with the one or more risk-associated parameters based on the obtained sensor data;

generating, based on the one or more estimated risk values, an adopted risk model by updating one or more model parameters of the baseline risk model for the specific location and/or scenario; and provisioning the generated adopted risk model for determining the acceptable risk model for forming the driving policy of the ADS.

11. The system according to claim 10, wherein the processing circuitry is further configured for:

provisioning the generated adopted risk model for determining the acceptable risk model by transmitting the generated adopted risk model of the vehicle to a remote server;

wherein the remote server is adapted for determining the acceptable risk model based on a plurality of adopted risk models transmitted by the plurality of human driver-operated or ADS-operated vehicles.

12. The system according to claim 10, wherein the vehicle is an ADS-equipped vehicle, and wherein the processing circuitry is further configured for:

receiving, from the remote server, the determined acceptable risk model formed based on consolidated information obtained from the plurality of human driver-operated and ADS-operated vehicles; and receiving, from the remote server, an updated driving policy of the ADS formed based on the determined acceptable risk model.

13. The system according to claim 12, wherein the consolidated information comprises the generated adopted risk models of the plurality of human driver-operated and ADS-operated vehicles being transmitted to the remote server; and wherein the determined acceptable risk model comprises one or more globally updated baseline risk model parameters determined based on the consolidated information fulfilling an acceptable risk criteria.

14. A vehicle comprising:

one or more vehicle-mounted sensors configured to monitor a surrounding environment, maneuvering and/or a driving behavior of the vehicle; and a system according to claim 10.

\* \* \* \* \*